(12) United States Patent
Choo

(10) Patent No.: US 8,099,589 B2
(45) Date of Patent: *Jan. 17, 2012

(54) SYSTEM AND METHOD FOR RAPID BOOT OF SECONDARY OPERATING SYSTEM

(75) Inventor: Eugene Kim Choo, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 671 days.

This patent is subject to a terminal disclaimer.

(21) Appl. No.: 12/197,501

(22) Filed: Aug. 25, 2008

(65) Prior Publication Data
US 2008/0313454 A1 Dec. 18, 2008

Related U.S. Application Data

(63) Continuation of application No. 11/357,279, filed on Feb. 16, 2006, now Pat. No. 7,469,336.

(60) Provisional application No. 60/693,633, filed on Jun. 24, 2005.

(51) Int. Cl.
*G06F 15/177* (2006.01)

(52) U.S. Cl. ............................................. 713/2; 713/1

(58) Field of Classification Search .................. 713/1, 2
See application file for complete search history.

(56) References Cited

U.S. PATENT DOCUMENTS

| | | | |
|---|---|---|---|
| 6,115,815 A | 9/2000 | Doragh et al. | |
| 6,209,088 B1 | 3/2001 | Reneris | |
| 6,662,267 B2 | 12/2003 | Stewart | |
| 6,968,450 B1 | 11/2005 | Rothberg et al. | |
| 7,373,493 B2 | 5/2008 | Hsu | |
| 7,469,336 B2 | 12/2008 | Choo | |
| 2003/0088326 A1 | 5/2003 | Sterling | |
| 2003/0093659 A1 | 5/2003 | Wen et al. | |
| 2003/0142561 A1 | 7/2003 | Mason et al. | |
| 2003/0233534 A1 | 12/2003 | Bernhard et al. | |
| 2004/0078636 A1 | 4/2004 | Suzaki | |
| 2005/0086551 A1 | 4/2005 | Wirasinghe et al. | |
| 2005/0278523 A1 | 12/2005 | Fortin et al. | |
| 2006/0200691 A1 | 9/2006 | Yomo et al. | |

FOREIGN PATENT DOCUMENTS

WO 03083694 9/2003
WO 2004012060 5/2008

*Primary Examiner* — Chun Cao
(74) *Attorney, Agent, or Firm* — John L. Rogitz

(57) ABSTRACT

The primary operating system of a computer such as a notebook computer is stored on disk in a hard disk drive and a smaller, secondary operating system such as an email operating system, wireless phone operating system, DVD player operating system, etc. is stored on disk and is transferred to flash memory within the HDD upon power-down of the primary operating system. In this way, should the user subsequently elect to power up the computer only for a limited secondary purpose, the user can elect to boot the associated secondary operating system from flash memory of the HDD without having to spin up the disks, saving energy and reducing boot time.

1 Claim, 3 Drawing Sheets

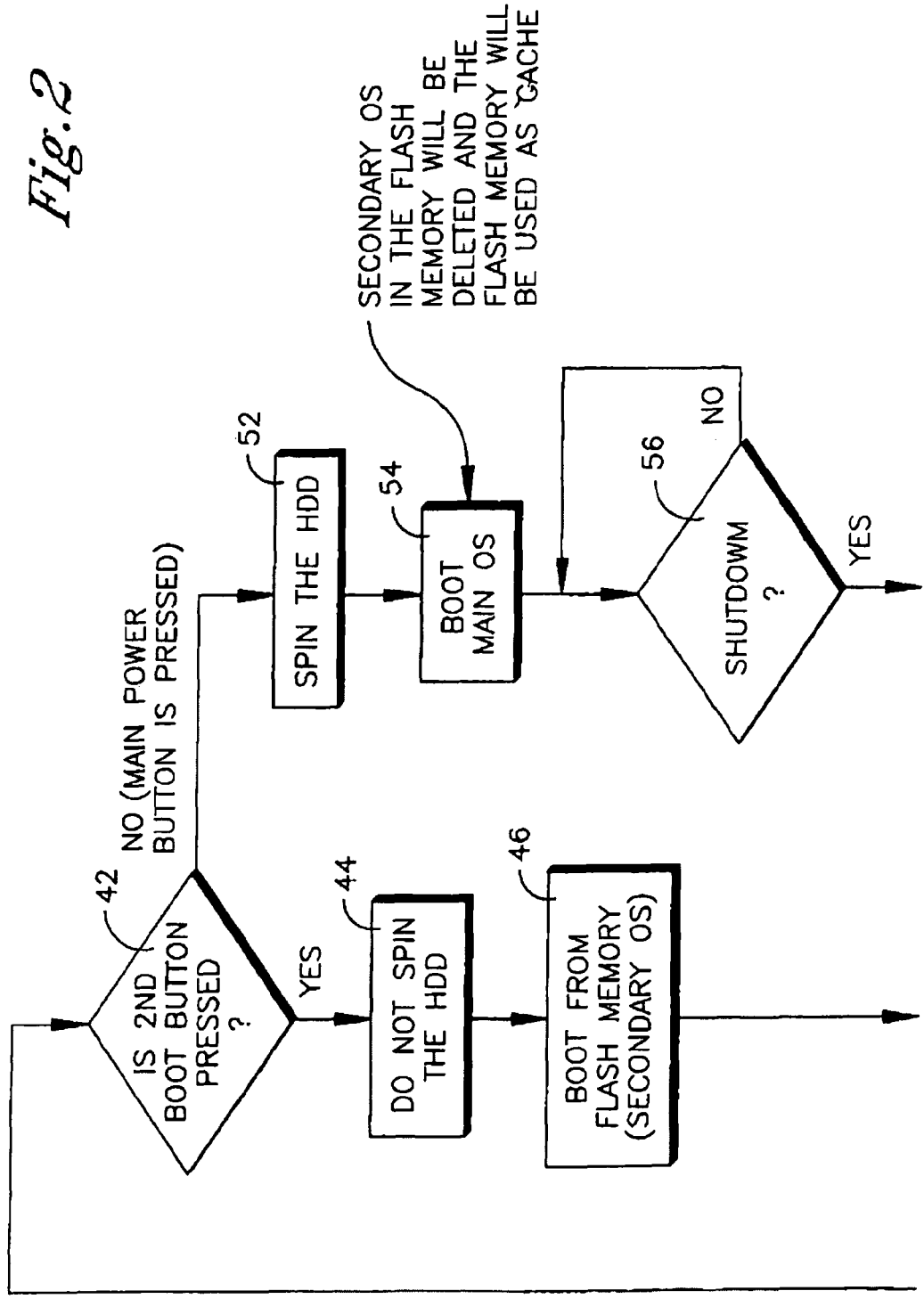

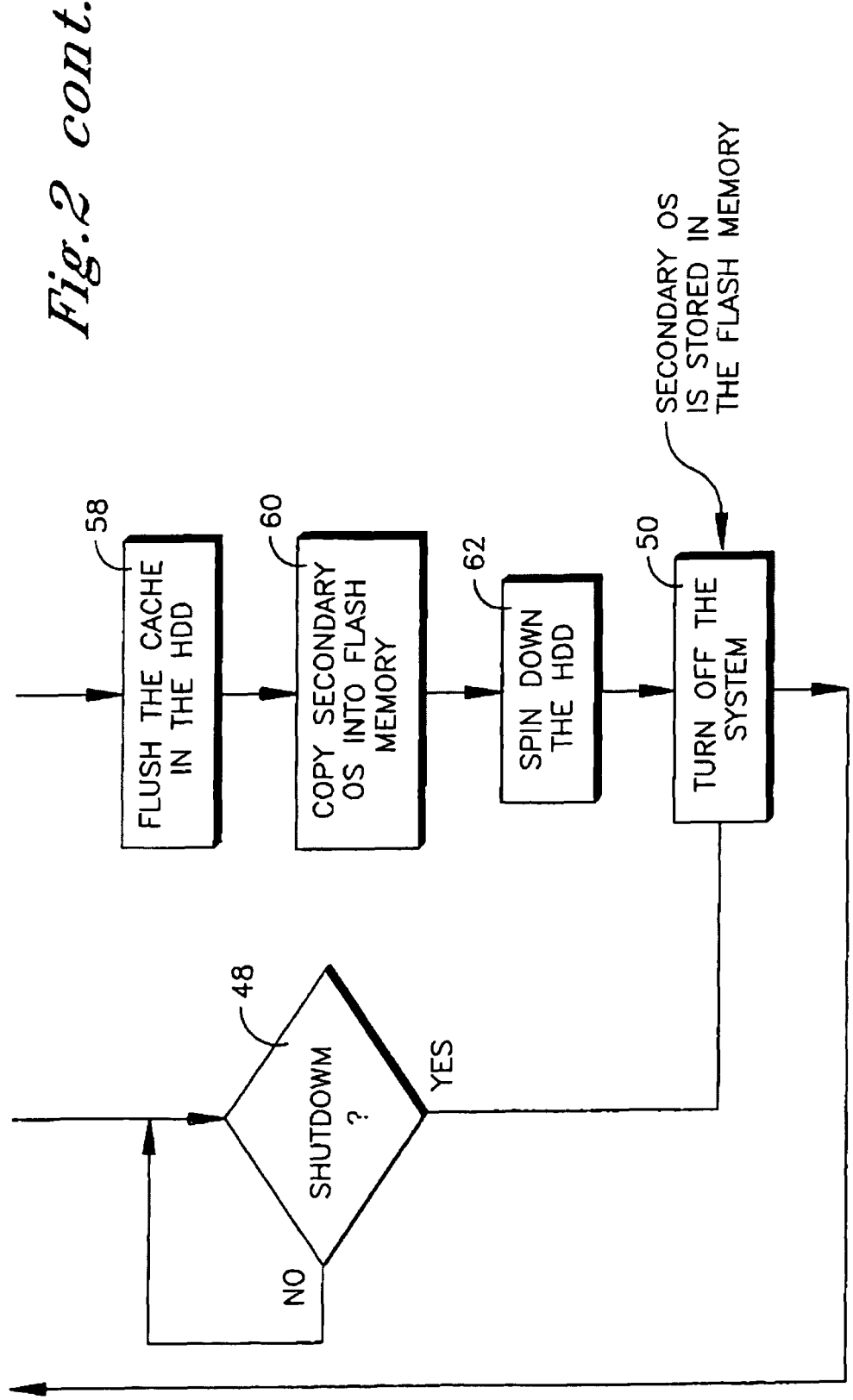

SYSTEM AND METHOD FOR RAPID BOOT OF SECONDARY OPERATING SYSTEM

RELATED APPLICATIONS

This is a continuation of and claims priority to U.S. patent application Ser. No. 11/357,279, filed Feb. 16, 2006, now U.S. Pat. No. 7,469,336, which in turn claims the benefit commonly claimed hereby of U.S. provisional patent application 60/693,633, filed Jun. 24, 2005.

FIELD OF THE INVENTION

The present invention relates generally to systems and methods for rapidly booting secondary operating systems of computers.

BACKGROUND OF THE INVENTION

When a computer is "booted", an operating system is loaded into memory from a hard disk drive. This means that the HDD must first be spun up and made operational, and then data transferred from disk to memory, lengthening the time to boot the computer.

In addition to the conventional functions of a personal computer (such as, e.g., word processing, spreadsheet generation, etc.) that are afforded by the primary operating system (such as, e.g., Windows7), some computers are configured to execute functions that may otherwise be performed by special purpose devices. For example, some notebook computers are configured to be used as simple DVD players, or as wireless telephones, or as email devices. In each case, the present invention recognizes that a simpler secondary operating system with correspondingly limited device drivers may be stored on the HDD to be booted in lieu of the computer's primary operating system. In this way, if all a user wishes to do is to use the computer for a relatively simple function and then shut the computer down, booting time can be reduced because only the relatively smaller secondary operating system associated with the desired function need be booted into memory.

As recognized herein, however, booting under such circumstances still requires the HDD to be spun up. Although booting time is reduced, it still requires some period of time, and furthermore spinning up a HDD consumes energy, which is particularly undesirable for battery-powered computers. Nevertheless, because existing basic input-output systems (BIOS) of computers (the small programs that initiate operating system booting and that are not borne on the HDD but instead are stored in relatively small solid state memory) typically are configured to access a HDD to obtain the operating system, it remains desirable to boot from a HDD, since that is where BIOS expects the operating system to be. With these recognitions in mind, the invention herein is provided.

SUMMARY OF THE INVENTION

A method is disclosed for reducing boot time of a secondary operating system of a computer that includes a processor accessing a hard disk drive (HDD). The HDD includes one or more disks storing the secondary operating system and a primary operating system. The HDD also includes a non-volatile solid state memory (NVM). The method includes receiving a power on signal that indicates whether the primary operating system or the secondary operating system is to be booted. If the primary operating system is to be booted, the disk(s) are spun up and the primary operating system is booted from disk into the main memory of the computer. If the secondary operating system is in the NVM, the NVM is flushed such that the NVM can be used as HDD cache. When a power down signal is received, the secondary operating system is copied from disk to NVM and then the computer is powered down. In contrast, if the secondary operating system is to be booted, it is booted directly from the NVM without spinning up the disk.

In non-limiting implementations the NVM can be a flash memory. The computer can include a first manipulable power on element and a second power on element. A power on signal indicating that the primary operating system is to be booted is generated when the first power on element is manipulated. On the other hand, a power on signal indicating that the secondary operating system is to be booted is generated when the second power on element is manipulated.

In another aspect, a computer system includes a processor, a computer memory accessible by the processor, and a hard disk drive (HDD) accessible by the processor and including at least one disk and a non-volatile solid state memory (NVM). A primary operating system is stored on the disk for booting thereof under control of the processor into the computer memory in a first condition. Also, a secondary operating system is on the disk and is also on the NVM for booting the secondary operating system from the NVM under control of the processor into the computer memory in a second condition.

In still another aspect, a computer includes processing means for booting and disk means for storing a primary operating system and a secondary operating system. Non-volatile solid state memory (NVM) means are provided for storing the secondary operating system. The processing means boots the primary operating system from the disk if a first power on signal is received. If, however, a second power on signal is received, the processing means boots the secondary operating system from the NVM means without spinning up the disk.

BRIEF DESCRIPTION OF THE DRAWINGS

The details of the present invention, both as to its structure and operation, can best be understood in reference to the accompanying drawings, in which like reference numerals refer to like parts, and in which:

FIG. 2 is a flow chart of the present logic.

DETAILED DESCRIPTION OF THE PREFERRED EMBODIMENTS

Figure 1:
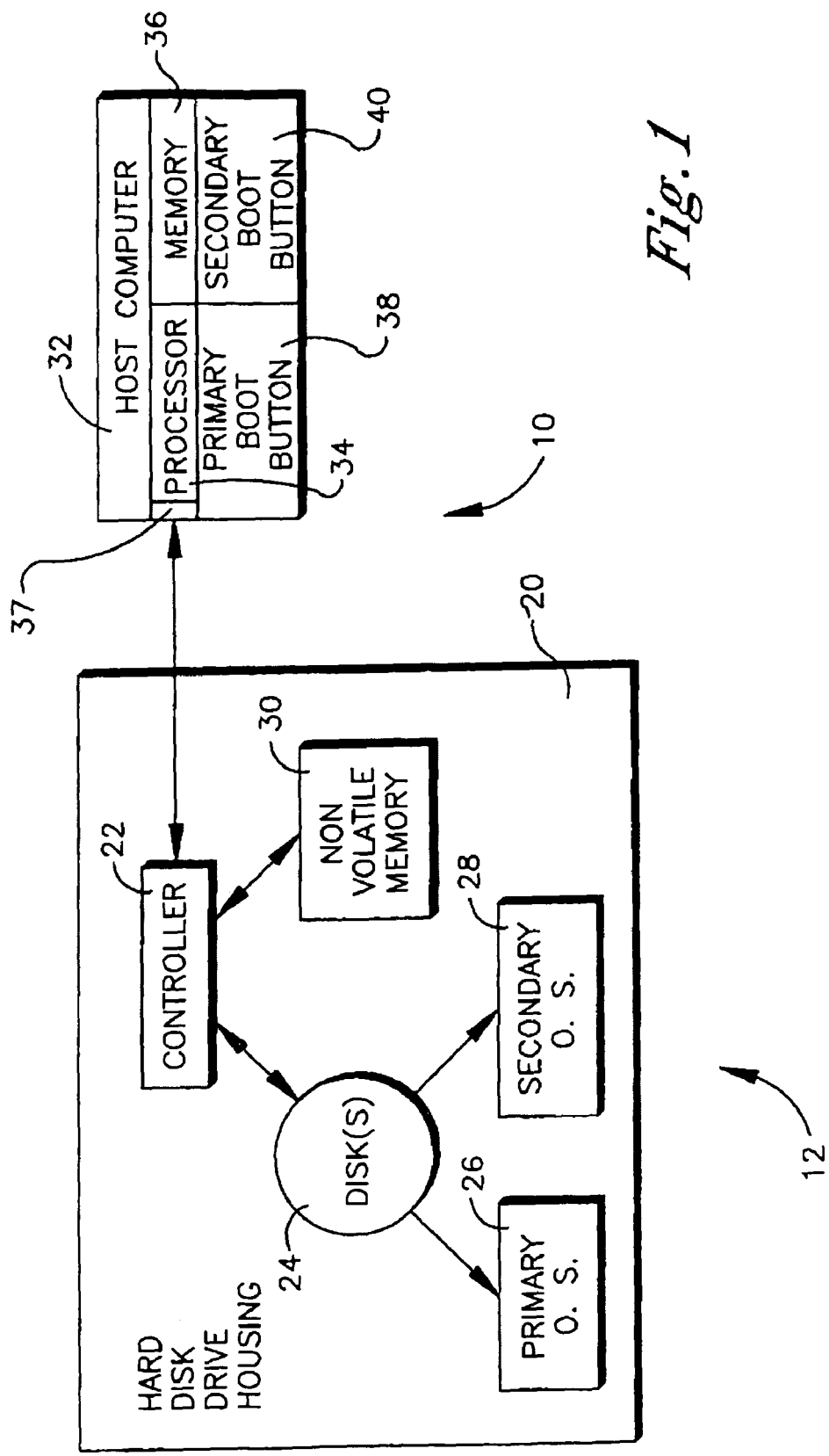
FIG. 1 is a schematic diagram of a non-limiting computer system.

Referring initially to FIG. 1, a non-limiting computer system is shown, generally designated 10, which includes a hard disk drive (HDD) 12 having a housing 20, and the housing 20 supports a HDD controller 22. The controller 22 is electrically connected to at least one hard disk 24. The disk(s) 24 store both a primary operating system 26 and at least one second operating system 28. Additional secondary O.S. can be provided for booting from NVM in accordance with principles set forth further below.

The controller 22 also accesses a non-volatile solid state memory (NVM) 30 that can be, without limitation, a flash memory device. A host computer 32 accesses the HDD 12, and as set forth further below, when the host computer 32 remains in the off mode, the NVM 30 contains a copy of the secondary operating system 28 that is stored on the HDD. This copy is kept in the NVM 30 for easy accessibility during a secondary operating system boot but is deleted from the NVM 30 if the primary operating system 26 is booted, because the primary operating system 26 typically uses the NVM 30 for other purposes (e.g., as a cache) while the primary operating system is in use.

As shown, in a non-limiting embodiment the host computer 32 includes a computer processor 34 and a non-limiting main memory 36. The processor 34 accesses the HDD 12 using an internal HDD controller 37. The non-limiting memory 36 may include any hardware associated with active computer memory, e.g. RAM memory, that is utilized by the host computer 32 to execute user commands. Additionally, the host computer 32 can include a first manipulable power on element 38 and a second power on element 40. Both power on elements may be buttons. While separate buttons are shown, it is to be understood that instead of physically separate buttons the two elements 38, 40 may be implemented by a single common button, toggle, or other element that may be manipulated differently depending on whether the primary or secondary O.S. is to be booted.

In any case, the first power on element 38, when manipulated, energizes the computer 32 and indicates to the processor 34 that the primary operating system 26 is to be booted firm disk to main memory 36. In contrast, when the second power on element 40 is manipulated, the computer 32 is energized and it is indicated to the processor 34 that the secondary operating system 28 is to be booted from the NVM 30 to the main memory 36. Now referring to FIG. 2, the logic for determining which operating system is initiated by the user is shown. For ease of exposition, FIG. 2 is illustrated in flow chart format, it being understood that in actual implementation other logic types may be used, e.g., state logic.

Beginning at decision diamond 42, the system receives a power-on signal and determines whether the signal is received from the secondary boot element 40. If the logic determines that the secondary boot element 40 has been manipulated, at block 44 the HDD does not initiate its disks to spin. Moving to block 46, the secondary operating system 28 is booted from the NVM 30 to the main memory 36 of the host computer. Operation of the secondary O.S. from main memory 36 is conducted without spinning up the disks until such time as a shutdown signal is received.

When it is determined that the a shutdown signal has been generated at decision diamond 48, the system turns off at block 50, with a copy of the secondary operating system 28 remaining stored within the flash memory of the NVM 30 of the HDD. The shutdown signal can be generated by, e.g., pressing a power button or by a software call in the operating system's "shutdown" module.

Returning to decision diamond 42, when the primary O.S. power-on element 38 is manipulated the logic flows to block 52 to spin up the disk(s) 24. Simultaneously, block 52 indicates that the secondary operating system stored in the NVM 30 is flushed so that the NVM 30 may be used as, e.g., a cache for the duration of the session.

Moving to block 54, the primary operating system 26 is booted from disk(s) 24 to the main memory 36 of the host computer. Operation of the primary O.S. from the main memory 36 continues until a shutdown signal is determined as being received at decision diamond 56, at which time the logic flows to block 58.

As shown in FIG. 2, at block 58 the NVM 30 in the HDD is flushed to make room for a new copy of the secondary operating system, which, it will be recalled, has been flushed at power-on and boot of the primary O.S. At block 60, a copy of the secondary operating system is copied from disk(s) 24 into the NVM 30 so that it may be ready for use during the next system start should the secondary power on element 40 be manipulated. At block 62 the disks 24 within the HDD spin down, closing the current session for the primary operating system. Concluding again at block 50, the system is turned off and the logic ends.

While the particular SYSTEM AND METHOD FOR RAPID BOOT OF SECONDARY OPERATING SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". For instance, while a secondary O.S. is discussed as being copied into NVM upon shutdown, more than one secondary O.S. may be copied into NVM and more than one secondary O.S. boot signal may be provided so that a select one of plural secondary O.S. may be booted from NVM without spinning up the disks. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

I claim:

1. A computer system, comprising:
   at least one processor;
   at least one computer memory accessible by the processor;
   at least one disk and at least one non-volatile solid state memory (NVM);
   at least one primary operating system stored on the disk for booting thereof under control of the processor into the computer memory in a first condition; and
   at least one secondary operating system on the disk and on the NVM for booting the secondary operating system from the NVM under control of the processor into the computer memory in a second condition,
   wherein the first condition is initiated by a first power on signal and the second condition is initiated by a second power on signal, wherein the secondary operating system is copied into the NVM as part of power down of the computer system from the first condition.

* * * * *